(12) United States Patent
Baldwin

(10) Patent No.: US 6,972,143 B2
(45) Date of Patent: Dec. 6, 2005

(54) PROTECTIVE U.V. CURABLE COVER LAYER FOR OPTICAL MEDIA

(76) Inventor: Kyle Baldwin, 30 Titus La., Seymour, CT (US) 06483

( * ) Notice: Subject to any disclaimer, the term of this patent is extended or adjusted under 35 U.S.C. 154(b) by 99 days.

(21) Appl. No.: 10/694,375

(22) Filed: Oct. 27, 2003

(65) Prior Publication Data

US 2005/0089666 A1 Apr. 28, 2005

(51) Int. Cl.⁷ ............................................. B32B 3/02
(52) U.S. Cl. ................. 428/64.1; 428/64.4; 428/65.2; 430/270.11; 156/272.2
(58) Field of Search ................ 428/64.1, 64.4, 428/65.2, 913; 430/270.11, 495.1, 945; 156/230, 272.8

(56) References Cited

U.S. PATENT DOCUMENTS

| | | |
|---|---|---|
| 6,254,957 B1 | 7/2001 | Zhou |
| 6,528,138 B2 | 3/2003 | Meinders et al. |
| 6,596,367 B2 | 7/2003 | Van Der Tempel |
| 2002/0132082 A1 * | 9/2002 | Hendriks .................. 428/64.4 |
| 2003/0106636 A1 * | 6/2003 | Kuo ........................... 156/247 |

* cited by examiner

*Primary Examiner*—Elizabeth Mulvaney
(74) *Attorney, Agent, or Firm*—Carmody & Torrance LLP

(57) ABSTRACT

The invention relates to a protective U.V. curable or photo-imageable cover layer for an optical disk substrate and a method of applying the protective cover layer to an optical substrate. The U.V. curable or photoimageable layer is applied as a dry film and has high clarity and cures to a flexible, scratch resistant, non-shrinking film, which has good adhesion to the underlying substrate.

22 Claims, No Drawings

PROTECTIVE U.V. CURABLE COVER LAYER FOR OPTICAL MEDIA

FIELD OF THE INVENTION

The invention relates to a protective U.V. curable cover layer for an optical disk substrate. The U.V. curable layer is applied as a dry film and has high clarity and cures to a flexible, scratch resistant, non-shrinking film, which has good adhesion to the underlying substrate.

BACKGROUND OF THE INVENTION

Optical disks and optical data storage media include for example compact disks (CD), digital versatile disks (DVD), digital video recording (DVR) disks, and the like. Optical disks generally comprise a synthetic resin substrate, which is successively provided with holes wherein information is stored, a reflection film covering these holes of the substrate of the disk, and a protective film formed on the reflection film.

A typical optical disk is comprised of several layers. First, a polycarbonate support layer is formed by injection molding of melted polycarbonate. Next, the several layers making up the read-write capabilities of the disk are applied to the support layer, most often by sputtering. These layers may include, for example, oxidative protective layers. Next, a series of layers including a reflective (silver) layer, a silicon nitride layer, and a zinc-sulfide combined with silica layer are applied by sputtering or other appropriate means. Finally, a protective coating may be applied. Various method of manufacturing optical disks are described for example in U.S. Pat. No. 6,254,957 to Zhou, U.S. Pat. No. 6,528,138 to Meinders et al., and U.S. Pat. No. 6,596,367 to Van Der Tempel, the subject matter of each of which is herein incorporated by reference in its entirety.

The DVR disk is a successor to the more conventional DVD disk, and has an expanded storage capacity of 25–50 GB. The DVR disk has the same dimensions as a conventional DVD disk (i.e., diameter of 120 mm and thickness of 1.2 mm). DVR disks may be referred to as DVR-red and DVR-blue, wherein red and blue refer to the wavelength of the laser light used to record information on the substrate.

A critical property required for high data storage capacity is disk flatness. This is particularly important with DVR disks, because information on the disk is written and read out through the cover layer. Therefore, the cover layer must be optically transparent (transmission>90% at 400 nm). The cover layer is required to be 100 $\mu$m thick, and the thickness variation cannot be more than ±2 $\mu$m over the entire disk surface.

The protective cover layer is frequently applied by laminating a thin polycarbonate layer having an adhesive on one side to the sputtered disk. However, this method is prohibitively expensive. Other materials, such as UV-light cured poly(meth)acrylate may also be used for the cover layer.

The protective cover layer must have high clarity, both initially and over time. The layer must cure to a flexible, scratch resistant, non-shrinking film, which has good adhesion to the sputtered layer on the polycarbonate disk. The protective cover layer must also must have absorption of less than 2 percent for a wavelength of 390 nm to 650 nm and an absorption of less than 50 percent for a wavelength of 350 nm. The refractive index should be between about 1.45 to about 1.70. The protective layer should also be free of optical defects, such as orange peel, wrinkles, etc.

There remains a need in the art for a method of making a protective cover layer for use on an optical disk substrate that is cost effective, but that meets the demanding specifications for use on an optical disk substrate. The inventors of the present invention have determined that a dry film resist applied as the cover layer, can yield a beneficial result.

SUMMARY OF THE INVENTION

The present invention relates to an optical media comprising an improved protective layer and a method of applying the protective layer to an optical substrate.

The improved optical media of the invention comprises the following:
a) a support layer
b) a series of read-write capability layers; and
c) a U.V. curable protective film.

The invention also contemplates a method of applying a protective film to an optical substrate comprising the steps of:
a) formulating a U.V. curable dry film by coating a U.V. curable composition onto a carrier sheet;
b) laminating the U.V. curable protective layer onto an optical substrate;
c) curing the U.V. curable film using actinic radiation for a time sufficient to achieve a complete cure of the photoimageable film; and
d) removing the carrier sheet from the U.V. curable film.

DETAILED DESCRIPTION OF THE PREFERRED EMBODIMENTS OF THE INVENTION

The invention comprises a U.V curable or photoimageable composition that can be applied as a dry film on an optical disk substrate. The novel compositions of the invention produce a cover layer having the desired features of high clarity, flexibility, and adhesion to the underlying substrate.

The dry film of the invention is a U.V. curable or photoimageable film made up of a UV-sensitive film "sandwich." The U.V. curable or photoimageable composition is coated over a carrier sheet with subsequent removal of solvent. The carrier sheet is generally a polymer, such as polyester or polyethylene terephthalate (PET). A removable protective layer, such as polyethylene, is applied to the other side of the U.V curable or photoimageable composition to prevent the adhesion of the material to the back side of the roll. The protective layer is then removed prior to lamination.

The film is laminated to the optical substrate using pressure and/or heat. The lamination step must occur below the softening point of polycarbonate, preferably between 25 and 60° C. The coating, prior to lamination, must be optically free from occlusions and surface defects. In the alternative, vacuum lamination may also be used.

After lamination, the U.V. curable or photoimageable film on the disk is cured using actinic radiation for a time sufficient to achieve a complete cure. After curing, the carrier sheet is removed. The resulting film produced on the DVR disk (or other optical substrate) is a permanent, optically clear coating.

The U.V. curable or photoimageable dry film composition is composed of a binder, a monomer and a photoinitiator system in an appropriate solvent. Additives may also be added to enhance various properties of the composition, including adhesion promoters, stabilizers, flow agents, and surfactants. Suitable compounds would generally be known to one skilled in the art.

The solvent is preferably selected from the group consisting of methyl ethyl ketone, acetone, toluene or other similar organic solvent.

The binder is preferably hydrophobic, with little or no acid functionality. The binder is generally an acrylic or methacrylic binder and is generally comprised of one or more of the derivatives of methyl, ethyl, propyl, and butyl acrylates and methacrylates. Suitable binders may be selected from (meth)acrylic acid, itaconic acid, ethyl(meth)acrylate, n-butyl(meth)acrylate, propyl(meth)acrylate, methyl(meth)acrylate, octyl(meth)acrylate, n-hexyl(meth)acrylate, t-butyl acrylate, secbutyl(meth)acrylate, isobutyl (meth)acrylate, 2-ethyl hexyl(meth)acrylate, styrene, substituted styrenes, vinyl esters, and mixtures of the foregoing. More preferably, the binder is methacrylate or isobutyl methacrylate. Most preferably, the binder is isobutyl methacrylate.

The glass transition temperature of the binder is generally within the range of 30° C. to 130° C., and is preferably about 55° C. The A# (A# is defined as milligrams of hydroxide per grams of binder: mg OH/g binder) of the binder is generally in the range of 0 to 100, and is preferably zero. The molecular weight (Mw) of the binder is preferably between 20,000 and 500,000, preferably 190,000. The binder ratio, in the absence of solvents is generally in the range of 40% to 90%, and is preferably 85%.

The monomers of the photoimageable composition are polymerizable alpha- and beta-ethylenically unsaturated compounds by free radical initiated chain propagating addition polymerization. The monomers belong to the family of acrylic or methacrylic acid or acid esters, or vinyl ethers, polyester acrylates, or polyurethane acrylates. Examples of suitable monomers include allyl(meth)acrylate, tetrahydrofurfuryl(meth)acrylate, isodecyl(meth)acrylate, 2(2-ethoxyethoxy)ethyl(meth)acrylate, stearyl(meth)acrylate, lauryl(meth)acrylate, 2-phenoxyethyl(meth)acrylate, glycidyl(meth)acrylate, isobornyl(meth)acrylate, tridecyl(meth)acrylate, isooctyl(meth)acrylate, caprolactone (meth)acrylate, polyethylene glycol(meth)acrylate, propylene glycol(meth)acrylate, ethylene glycol(meth)acrylate, 1,3-butylene glycol di(meth)acrylate, 1,6-hexanediol di(meth)acrylate, neopentyl glycol di(meth)acrylate, polyethylene glycol di(meth)acrylate, polypropylene glycol di(meth)acrylate, ethoxylated bisphenol A di(meth)acrylate, propoxylated bisphenol A di(meth)acrylate, alkoxylated cyclohexane dimethanol di(meth)acrylate, cyclohexane dimethanol di(meth)acrylate, trimethylolpropane tri(meth)acrylate, ethoxylated trimethylolpropane tri(meth)acrylate, propoxylated trimethylolpropane tri(meth)acrylate, tris(2-hydroxy ethyl)isocyanurate tri(meth)acrylate, pentaerythritol tri(meth)acrylate, ethoxylated glycerol tri(meth)acrylate, propoxylated glycerol tri(meth)acrylate, pentaerythritol tetra(meth)acrylate, ethoxylated pentaerythritol tetra(meth)acrylate, propoxylated pentaerythritol tetra(meth)acrylate, dipentaerythritol penta(meth)acrylate, dipentaerythritol hexa(meth)acrylate, polyester(meth)acrylates, polyurethane (meth)acrylates, and combinations of the foregoing. It is preferable that the composition contain a combination of monomers, wherein at least one monomer is monofunctional and that at least one monomer is multifunctional. The preferred monomer is 2-phenoxyethyl methacrylate.

To initiate free-radical addition polymerization and crosslinking of the binder polymer within the photopolymerizable monomers upon exposure to actinic radiation, the photoimageable composition contains a free-radical generating photoinitiator system. Suitable photoinitiators include, but are not limited to, benzoin ethers, benzil ketals, acetophenones, and benzophenones. The photoinitiators may be used alone or in combination with other synergists. A preferred photoinitiator is 1-hydroxy cyclohexyl phenyl ketone.

The invention will now be described by the following non-limiting examples. Each of the examples was mixed using an air stirrer and then drawn down, dried to remove solvent, and laminated to the sputtered layer of the optical media (DVR).

| Example 1 | Concentration (parts by wt.) |
|---|---|
| p-isobutyl methacrylate | 40.49 parts |
| methyl ethyl ketone | 49.48 parts |
| 2-phenoxy ethyl methacrylate | 4.30 parts |
| propoxylated trimethylolpropane triacrylate | 4.70 parts |
| 1-hydroxy cyclohexyl phenyl ketone | 1.03 parts |

Binder p-isobutyl methacrylate has a molecular weight of 190,000 (polystyrene standardized), a $T_g$ of 55° C., and an A# of 0.0.

| Example 2 | Concentration (parts by wt.) |
|---|---|
| methacrylate | 16.69 |
| methyl ethyl ketone | 66.78 |
| 2-phenoxy ethyl methacrylate | 5.51 |
| propoxylated trimethylolpropane triacrylate | 5.51 |
| 1-hydroxy cyclohexyl phenyl ketone | 0.33 |
| tris (2-hydroxy ethyl) isocyanurate triacrylate | 5.18 |

The binder, methacrylate, is a product from Rohm America, product number Degalon 8744f, has a molecular weight of 170,000 (polystyrene standardized), a Tg of 120° C. and an A # of 0.

Table 1 describes exemplary properties of the protective layer for the optical disk substrate.

TABLE 1

Properties of DVR Protective Layer

| Property | Spec |
|---|---|
| Geometrical | |
| Nominal thickness (min/max value for all disks) | 100 ± 5 $\mu$m |
| Variation in one disk surface | reference thickness ±2 $\mu$m<br>Spectral: focus error <45 nm |
| Optical | |
| Absorption | <2% for 390 < $\lambda$ < 650 nm<br><50% for $\lambda$ = 350 nm |
| Refractive index | 1.45–1.70 |
| Birefringence | $\lambda$ = 0.4 $\mu$m $\Delta n_{//}$ < 1.5 × $10^{-4}$<br>$\Delta n_\perp$ < 1.2 × $10^{-3}$ |
| Mechanical | |
| Young's Modulus | 4 Gpa |
| Scratch resistance | No scratches |

TABLE 1-continued

Properties of DVR Protective Layer

| Property | Spec |
|---|---|
| Thermal | |
| Temperature resistance | 100° C. |
| Dust | |
| Protective cover | Low roughness |
| Geometrical | |
| Tilt | Radial <0.3° |
| | Tangential <0.15° |
| Peeling stress | >10 MPa |
| Aging | |
| Dry heat test | 96 h at 80° C., <20% relative humidity |
| Cold storage test | 24 h at −20° C. |
| Damp heat test | 3 × 240 h at 80° C., 85% relative humidity |

Optimal properties for the U.V. curable or photoimageable coating include good uncured adhesion of the film to the support layer (i.e. disk) during lamination, excellent cured adhesion of the film to the support layer, flexibility of the cured film, little or no tilt or warping of the disk during lamination and cure, optical clarity, non-yellowing film over time and a scratch resistant film.

The lamination step, which occurs before cure, is preferably done at as low a temperature as possible. Ambient (about 21° C.) is preferred, but up to the softening point of the polycarbonate disk is allowed (about 90° C.). Preferably the lamination temperature is not higher than 60° C.

Tilt or warping is also a major concern to the manufacturers of optical read disks. Tilt may be radial or tangential. Radial tilt is a one dimensional warping of the disk whereas tangential tilt consists of curvature out of the theoretical flat plane of the disk in two dimensions. Tilt may occur at one of four stages in processing: injection molding of the disk; lamination of the dry film protective coating; curing of the dry film proactive coating; and later exposure of the disk to humidity through testing or use.

Minimization of tilt during lamination can be achieved through low lamination temperatures and the use of vacuum lamination. Minimization of tilting during the cure process can be achieved by minimizing the amount of shrinkage of the dry film coating during curing. Film shrinkage may be minimized by using higher molecular weight monomers (i.e. molecular weights from 126 to 2000, preferably 200 to 1000), using monofunctional monomers, and/or by increasing the proportion of binder relative to monomer. Tilt caused by absorption of moisture can be minimized by ensuring full cure of a highly cross linked coating, designing a highly hydrophobic coating, and/or using a binder with a high Tg. The monomer found to give the best balance of hydrophobicity, cross link density and flexibility was propoxylated trimethylol propane triacrylate.

What is claimed is:

1. An optical media comprising:
   a) a support layer;
   b) a series of read-write capability layers; and
   c) U.V. curable or photoimageable protective film comprising a binder, one or more monomers and a photoinitiator.

2. The optical media according to claim 1, wherein the binder is hydrophobic with little or no acid functionality.

3. The optical media according to claim 2 wherein said binder is selected from the group consisting of (meth)acrylic acid, itaconic acid, ethyl(meth)acrylate, n-butyl (meth)acrylate, propyl(meth)acrylate, methyl(meth)acrylate, octyl acrylate, n-hexyl (meth)acrylate, t-butyl(meth)acrylate, secbutyl(meth)acrylate, isobutyl (meth)acrylate, 2-ethyl hexyl(meth)acrylate, styrene, isobutyl(meth)acrylate, substituted styrenes, and vinyl esters.

4. The optical media according to claim 3 wherein the binder is isobutyl methacrylate.

5. The optical media according to claim 1 wherein the one or more monomers are selected from the group consisting of acrylic and methacrylic acid and acid esters, vinyl ethers, polyester acrylates, and polyurethane acrylates.

6. The optical media according to claim 5 wherein said one or more monomers are selected from the group consisting of allyl(meth)acrylate. tetrahydrofurfuryl(meth)acrylate, isodecyl(meth)acrylate, 2(2-ethoxyethoxy) ethyl (meth)acrylate, stearyl(meth)acrylate, lauryl(meth)acrylate, 2-phenoxyethyl (meth)acrylate, glycidyl(meth)acrylate, isobornyl(meth)acrylate, tridecyl (meth)acrylate, isooctyl (meth)acrylate, caprolactone(meth)acrylate, polyethylene glycol(meth)acrylate, propylene glycol(meth)acrylate, ethylene glycol(meth)acrylate, 1,3-butylene glycol di(meth)acrylate. 1,6-hexanediol di(meth)acrylate, neopentyl glycol di(meth)acrylate, polyethylene glycol di(meth)acrylate, polypropylene glycol di(meth)acrylate, ethoxylated bisphenol A di(meth)acrylate, propoxylated bisphenol A di(meth)acrylate, alkoxylated cyclohexane dimethanol di(meth)acrylate, cyclohexane dimethanol di(meth)acrylate, trimethylolpropane tri(meth)acrylate, ethoxylated trimethylolpropane tri(meth)acrylate, propoxylated trimethylolpropane tri(meth)acrylate, tris (2-hydroxy ethyl) isocyanurate tri(meth)acrylate, pentaerythritol tri(meth)acrylate, ethoxylated glycerol tri(meth)acrylate, propoxylated glycerol tri (meth)acrylate, pentaerythritol tetra(meth)acrylate, ethoxylated pentaerythritol terra(meth)acrylate, propoxylated pentaerythritol tetra(meth)acrylate, dipentaerythritol penta (meth)acrylate, dipentaerythritol hexa(meth)acrylate, polyester(meth)acrylates, polyurethane (meth)acrylates, and combinations of the foregoing.

7. The optical media according to claim 6 wherein at least one monomer is monofunctional and at least one monomer is multifunctional.

8. The optical media according to claim 1 wherein the photoinitiator is selected from the group consisting of benzoin ethers, benzyl ketals, acetophenones, benzophenones, and combinations of the foregoing.

9. The optical media according to claim 8 wherein the photoinitiator comprises 1-hydroxy cyclohexyl phenyl ketone.

10. The optical media according to claim 2 wherein the U.V. curable or photoimageable protective film further comprises an additive selected from the group consisting of adhesion promoters, stabilizers, flow additives, surfactants, and other additives.

11. A method of applying a protective film to an optical substrate comprising the steps of:
   a. formulating a U.V. curable or photoimageable dry film by coating a U.V. curable or photoimageable composition onto a carrier sheet;
   b. laminating the U.V. curable or photoimageable protective layer onto an optical substrate;
   c. curing the U.V. curable or photoimageable film using actinic radiation for a time sufficient to achieve a complete cure of the photoimageable film; and
   d. removing the carrier sheet from the film.

12. The method according to claim 11 wherein the carrier sheet is selected from the group consisting of polyester and polyethylene terephthalate.

13. The method according to claim 11 wherein the U.V. curable or photoimageable composition comprises a binder, a solvent, a monomer, and a photoinitiator.

14. The method according to claim 13 wherein the binder is hydrophobic with little or no acid functionality.

15. The method according to claim 14 wherein said binder is selected from the group consisting of (meth)acrylic acid, itaconic acid, ethyl(meth)acrylate, n-butyl (meth)acrylate, propyl(meth)acrylate, methyl(meth)acrylate, octyl(meth) acrylate, n-hexyl (meth)acrylate, t-butyl(meth)acrylate, secbutyl(meth)acrylate, isobutyl (meth)acrylate, 2-ethyl hexyl(meth)acrylate, styrene, isobutyl methacrylate, substituted styrenes, and vinyl esters.

16. The method according to claim 15 wherein the binder is isobutyl methacrylate.

17. The method according to claim 13, wherein the one or more monomers are selected from the group consisting of acrylic and methacrylic acid and acid esters, vinyl ethers, polyester acrylates, and polyurethane acrylates.

18. The method according to claim 17 wherein said one or more monomers are selected from the group consisting of allyl(meth)acrylate, tetrahydrofurfuryl (meth)acrylate, isodecyl(meth)acrylate, 2(2-ethoxyethoxy) ethyl(meth) acrylate, stearyl(meth)acrylate, lauryl(meth)acrylate, 2-phenoxyethyl(meth)acrylate, glycidyl (meth)acrylate, isobornyl(meth)acrylate, tridecyl(meth)acrylate, isooctyl (meth)acrylate, caprolactone(meth)acrylate polyethylene glycol(meth)acrylate, propylene glycol(meth)acrylate, ethylene glycol(meth)acrylate, 1,3-butylene glycol di(meth) acrylate, 1,6-hexanediol di(meth)acrylate, neopentyl glycol di(meth)acrylate, polyethylene glycol di(meth)acrylate, polypropylene glycol di(meth)acrylate, ethoxylated bisphenol A di(meth)acrylate, propoxylated bisphenol A di(meth) acrylate, alkoxylated cyclohexane dimethanol di(meth) acrylate cyclohexane dimethanol di(meth)acrylate, trimethylolpropane tri(meth)acrylate, ethoxylated trimethylolpropane tri(meth)acrylate, propoxylated trimethylolpropane tri(meth)acrylate, tris (2-hydroxy ethyl) isocyanurate tri(meth)acrylate, pentaerythritol tri(meth)acrylate, ethoxylated glycerol tri(meth)acrylate, propoxylated glycerol tri (meth)acrylate, pentaerythritol tetra(meth)acrylate, ethoxylated pentaerythritol tetra(meth)acrylate, propoxylated pentaerythritol tetra(meth)acrylate, dipentaerythritol penta (meth)acrylate, dipentaerythritol hexa(meth)acrylate, polyester(meth)acrylates, polyurethane(meth)acrylates, and combinations of the foregoing.

19. The method according to claim 18 wherein at least one monomer is monofunctional and at least one monomer is multifunctional.

20. The method according to claim 13 wherein the photoinitiator is selected from the group consisting of benzoin ethers, benzyl ketals, acetophenones, benzophenones, and combinations of the foregoing.

21. The method according to claim 20 wherein the photoinitiator comprises 1-hydroxy cyclohexyl phenyl ketone.

22. The method according to claim 13 wherein the U.V. curable or photoimageable protective film further comprises an additive selected from the group consisting of adhesion promoters, stabilizers, flow additives, surfactants, and other additives.

* * * * *

UNITED STATES PATENT AND TRADEMARK OFFICE
CERTIFICATE OF CORRECTION

PATENT NO. : 6,972,143 B2
DATED : December 6, 2005
INVENTOR(S) : Kyle Baldwin

It is certified that error appears in the above-identified patent and that said Letters Patent is hereby corrected as shown below:

<u>Column 6,</u>
Line 35, delete "terra(meth)acrylate" and replace it with -- tetra(meth)acrylate --.
Line 50, delete "claim 2" and replace it with -- claim 1 --.

Signed and Sealed this

Seventh Day of March, 2006

JON W. DUDAS
*Director of the United States Patent and Trademark Office*